(12) United States Patent
Bresolin

(10) Patent No.: US 6,779,485 B2
(45) Date of Patent: Aug. 24, 2004

(54) AUTOMATIC DISTRIBUTOR OF FISH FOOD FOR AQUARIUMS

(75) Inventor: Valerio Bresolin, Vicenza (IT)

(73) Assignee: Hydor SRL, Vicenza (IT)

( * ) Notice: Subject to any disclaimer, the term of this patent is extended or adjusted under 35 U.S.C. 154(b) by 0 days.

(21) Appl. No.: 10/154,849

(22) Filed: May 28, 2002

(65) Prior Publication Data
US 2003/0015143 A1 Jan. 23, 2003

(30) Foreign Application Priority Data
Jul. 17, 2001 (IT) .................... VE2001A0032

(51) Int. Cl.⁷ .................................. A01K 61/02
(52) U.S. Cl. ............... 119/51.04; 119/210; 119/269; 119/57.11; 119/57.92; 222/63; 222/553; 222/638; 222/650
(58) Field of Search ............... 119/51.04, 210, 119/212, 230, 242, 269, 51.11, 57.1, 57.92, 245; 222/63, 553, 638, 650

(56) References Cited

U.S. PATENT DOCUMENTS

| | | | | |
|---|---|---|---|---|
| 2,700,489 A | * | 1/1955 | Sheft | 222/170 |
| 2,847,066 A | * | 8/1958 | Kleiber et al. | 222/48 |
| 3,156,214 A | * | 11/1964 | Denney et al. | |
| 4,256,058 A | * | 3/1981 | Deakins | 119/51.11 |
| 4,296,710 A | * | 10/1981 | Sillers, III | 119/51.11 |
| 5,003,925 A | * | 4/1991 | Roberts | 119/51.04 |
| 5,133,292 A | * | 7/1992 | Kirk | 119/51.04 |
| 5,154,547 A | * | 10/1992 | Young | 119/51.04 |
| 5,199,381 A | * | 4/1993 | Masopust | 119/51.04 |
| 5,230,300 A | * | 7/1993 | Mezhinsky | 119/51.11 |
| 5,259,533 A | * | 11/1993 | Kornfein et al. | 222/170 |
| 5,303,672 A | * | 4/1994 | Morris | 119/51.11 |
| 5,709,319 A | * | 1/1998 | Yao | 222/170 |

FOREIGN PATENT DOCUMENTS

| | | | | | |
|---|---|---|---|---|---|
| GB | 2151442 A | * | 7/1985 | | A01K/61/02 |
| GB | 2170087 A | * | 7/1986 | | A01K/5/02 |
| GB | 2221059 A | * | 1/1990 | | A01K/61/02 |
| GB | 2241858 A | * | 9/1991 | | A01K/1/02 |
| GB | 2264618 A | * | 9/1993 | | A01K/11/24 |

* cited by examiner

Primary Examiner—Peter M. Poon
Assistant Examiner—Andrea M. Valenti
(74) Attorney, Agent, or Firm—Griffin & Szipl, P.C.

(57) ABSTRACT

An automatic distributor of fish food for aquariums comprising a rotating container (30) for fish food, a cover (40), an electric motor (53) and transmission (54) for transmitting the motion to the rotating container (30). At the bottom (31) of the container (30) there is an housing (14) for the electric motor (53) and the transmission (54), and furthermore the rotation axis of the rotating container (30) is aligned with the motor axis of the electric motor (53).

17 Claims, 3 Drawing Sheets

AUTOMATIC DISTRIBUTOR OF FISH FOOD FOR AQUARIUMS

FIELD OF THE INVENTION

The present invention concerns an automatic distributor of fish food, also known as a "manger".

BACKGROUND OF THE INVENTION

The fish food distributors are placed over the aquariums and they consist of a container for fish food which is filled with fish food of the type in accordance to the kind of fish which are to be fed and it is closed by a cover. Near the free edge of the container, there is an opening for the exit of fish food. The container is rotating around its rotation axis which is horizontally placed. The rotation of the container is made by an electric motor which, by means of the intermediate mechanisms and transmission members, transmits the motion from the electric motor to the rotation axis of the container. Upon every rotation of the container, a predetermined amount of fish food comes out from the opening and falls into the aquarium.

In order to programme the frequency at which the fish food is supplied, there is a control system which consists of an electronic card PCB (printed circuit board) and a lighting display on which the programmed data, inserted by a knob, appear. The distributor may be programmed to distribute at various time: for example it is possible to programme one feeding every 8 hours, and thus every 8 hours the container makes one revolution; it is possible also to double the amount by simply making the container do two revolutions every 8 hours.

SUMMARY OF THE INVENTION

The electric motor, the electronic card and the lighting display are all supplied by an electric battery. In the end, all the components, that is the electric motor, the transmission members, the container with the cover, the electronic card, the lighting display and the electric battery are mounted on a suitable support.

However, the distributors of fish food of the prior art described above have quite a lot of drawbacks, which emerge during the construction of the distributor and during its use. In fact, the mechanism and the transmission members used for transmitting the motion from the electric motor to the container are composed of several gears as well as crown gears, helicoidal screws, toothed wheels, pinions and other things which make the construction and the mounting very difficult. Consequently, the final cost of the product increases and, the reliability decreases due to the wear and the clearance between the gears; the device is liable to break or however malfunction, thus compromising its rightful use. The use of such a high number of gears increases the volume and then the dimension of the product causing a "visual nuisance", thus damaging the beauty of the aquarium. It is possible to reduce the dimension of the container but in doing so, the maximum amount of fish food, which could be put in, decreases. At the same time the self-sufficiency of the distributor reduces, hence compelling the user to fill up the container more frequently.

The automatic distributor is provided with a sophisticated electronic card because it functions as a programme and the distributor is also provided with a lighting display in order to visualize the input data.

It is easy to understand that the cost of such a simple device, such as an automatic distributor for fish food, may notably increase.

Furthermore, the automatic distributors of the prior art have a limitation due to the fact that it is difficult to dose the amount of fish food in the proper way upon each rotation of the container. In fact, fish food may vary a lot, both in the shape and in the dimension depending on the kind of fish, on their dimension and number.

In particular, the shape of fish food may be quite different, such as pellets, flakes and tablets.

Moreover moisture, always in existence in the upper part of the aquarium, covers the external surface of the container, and during the rotation of the container flows along its external surface until reaching the opening where the fish food comes out. Moisture comes into contact with the fish food making it sticky and, thus, the fish food adheres to the distributor, hindering the exit of fish food.

The main scope of the invention is to obtain a distributor which is made up of only a few components and thus simpler, hence facilitating the construction and mounting operations and, thus, less liable to break or malfunction and therefore more reliable. The distributor must have reduced dimensions.

Another aim of the invention is to permit the regulation of the distributor according to the kind of fish food contained in the container so as to regulate the amount of fish food in the correct manner.

Another aim is to prevent moisture from hindering the exit of fish food form the container.

Finally, the invention must allow for further simplification the distributor, making it unnecessary to use the lighting display and only necessitating a simplified electronic card.

The aim is achieved by an automatic distributor of fish food for aquariums of the initially described type, that comprises a container for fish food rotating around a substantially horizontal rotation axis and provided with an opening, near the free end of the container, for the exit of fish food by gravity, a cover for said container, motor means provided with a rotation axis and transmission means for transmitting the motion from said motor means to said container, control means for programming the rotation of said container, characterized in that said container has at the bottom a recess forming a housing for said motor means and said transmission means, and also that said rotation axis of the container is aligned with said motor axis of said motor means.

In such a way the transmission from the motor means and the container is remarkably simplified and, moreover, being contained inside the container, permits it to optimize the available space thus reducing the overall dimensions of the distributor.

In particular the motor means and the transmission means consist of a motoreducer thus reducing the number of the components utilized and further simplifying the distributor, thus making it very simple.

Preferably, the cover and the container are provided with regulatory setting means for the passage way for the exit, by gravity, of fish food through the opening of the container.

Therefore, depending on the type, or better the shape of fish food and its dimension, the outlet is set in the proper manner by regulatory setting means.

Furthermore, the support means comprise a tab adjustable between two positions, a first position or rest position wherein the tab covers the lower portion of said container at the area where the fish food comes out and, a second position or operative position wherein the tab does not cover the lower portion of said container at the area where the fish food comes out, said tab being shifted to the opened position by the rotation of said container and shifted to the closed position by elastic means.

The tab covers the area where the fish food comes out, when the container has already discharged fish food, thus preventing that moisture, existing in the aquarium comes into contact with the external surface of the container and, hence limiting the possibility that moisture enters in the container through the opening where the fish food comes out.

These and other advantages of the present invention may be more evident by the following detailed description of some embodiments given for an illustrative and not limitative purpose with reference to the subsequent enclosed drawings wherein:

DESCRIPTIONS OF THE DRAWINGS

DETAILED DESCRIPTION OF THE INVENTION

Figure 1:
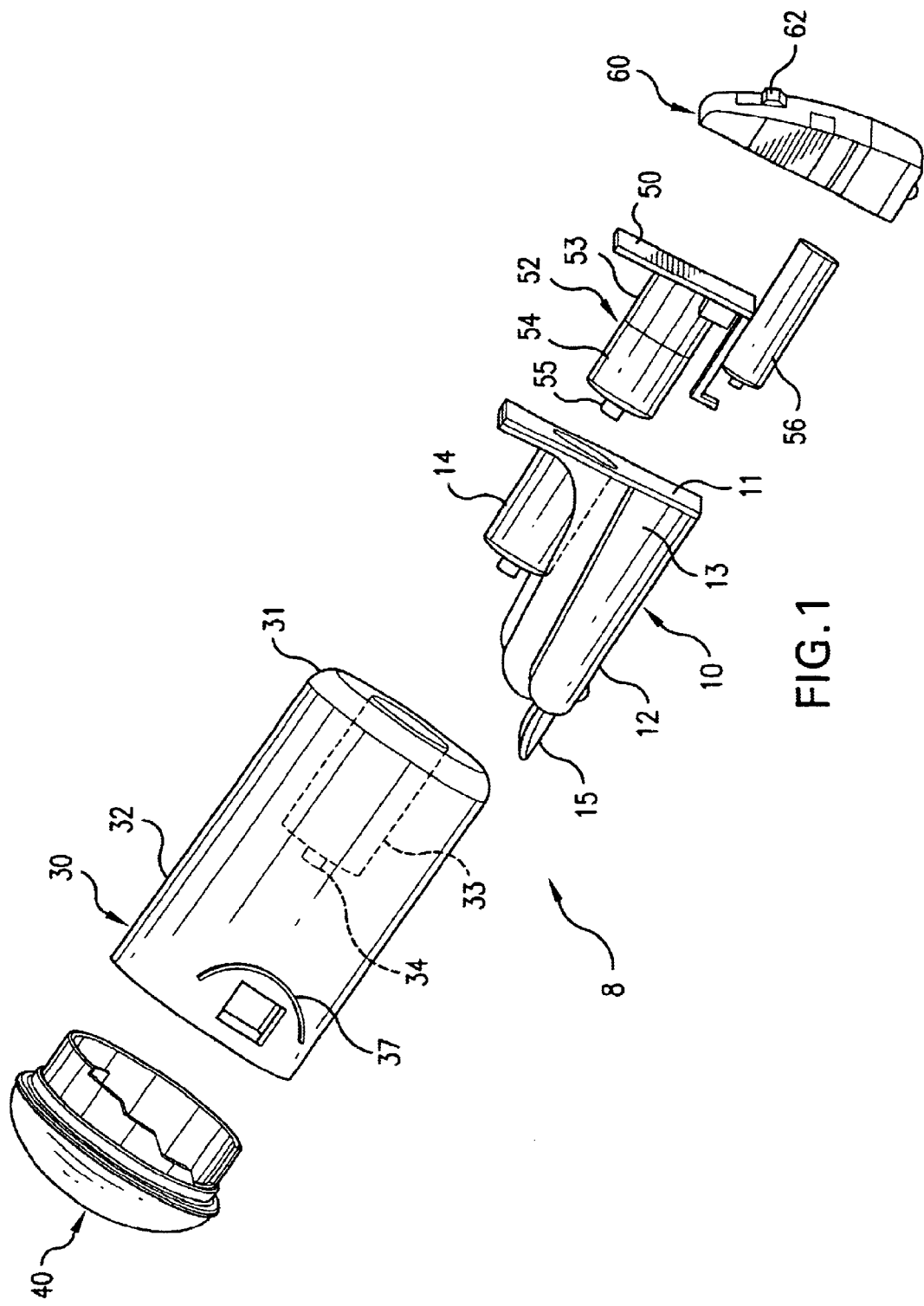
FIG. 1 is an exploded view of an automatic distributor according to the present invention.
Figure 2:
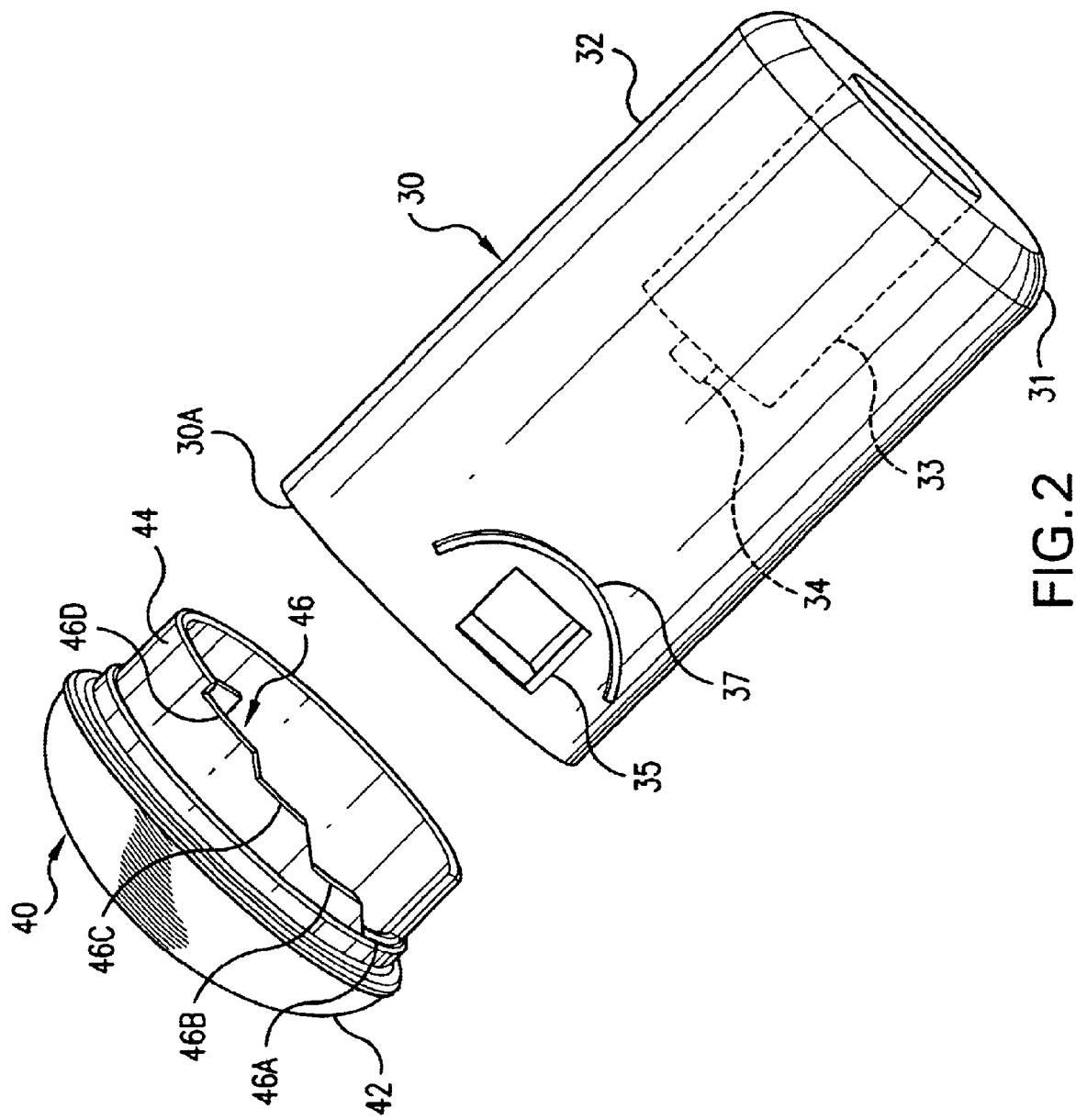
FIGS. 2 and 3 are perspective views of the container and of the cover of the distributor of FIG. 1.

FIG. 1 illustrates an automatic distributor 8 of fish food for aquariums comprising a support 10 including a flat base 11 on which a curved wall 12 extends perpendicularly. On the flat base 11 there is a substantially cylindrical container 30 of fish food comprising a bottom 31 and a cylindrical wall 32 closed at one end by the bottom 31 and defining at the opposite end an open edge 30A, as indicated in FIGS. 1 and 2. Near the open edge 30A, the container 30 is provided with a substantially rectangular opening 35 for the exit of fish food.

Figure 3:
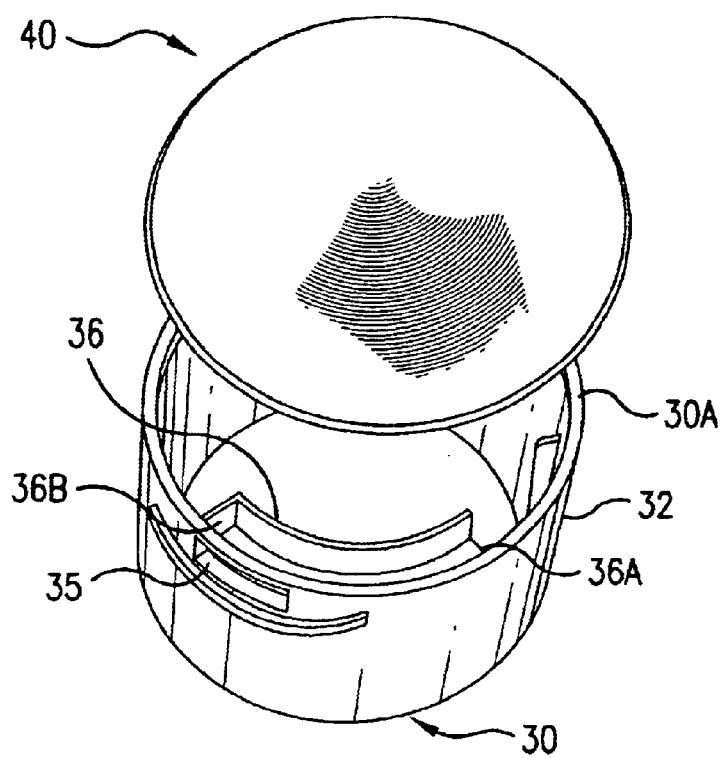

From FIG. 3, it can be noted that inside the container 30, near the open edge 30A, there is a feeding channel 36 for fish food which circumferentially extends and is in contact with the cylindrical wall 32, open at the side facing the open edge 30A and having two ends, a first end 36A in communication with the inner part of the container 30 and a second end 36B in communication with the opening 35 of the container 30.

As shown in FIG. 2, on the container 30 a cover 40 is applied which comprises a cup 42 and a cylindrical tang 44 designed to internally fit to the cylindrical wall 32 of the container 30.

The cylindrical tang 44 has a stair-like shape formed by four recessed steps 46A,46B,46C,46D with respect to the circumferential edge of the cylindrical tang 44 and designed to internally engage with the feeding channel 36 through its open side. By rotating the cover 40 with respect to the container 30 the area of passage for fish food in the feeding channel 36 varies, thus permitting the passage of fish food of different shapes. In fact, when rotating the container 30 fish food comes into the first end 36A of the feeding channel 36, flows along the feeding channel 36 passes through the passage defined by the feeding channel 36 and the least recessed step which is internally engaged into the feeding channel 36 and, finally, comes out from the opening 35 of the container 30.

The recessed steps 46 are 4 in number, consequently it is possible to have a maximum of 4 types of setting and therefore to introduce 4 different kinds of fish food such as flakes, pellets, disks and tablets. In this manner, the feeding channel 36 and the recessed steps 46 provide the cover 40 and the container 30 with regulatory setting means of the passage way for exit, by gravity, of fish food through the opening 35 of the container 30.

The automatic distributor 8 also comprises an electronic card 50 for the programming of the feeding cycle of fish food. The electronic card 50 is a control means for programming the rotation of the container 30. On the electronic card 50 a coaxial motoreducer 52 is mounted which comprises an electric motor 53 and a reducer 54 having an exit shaft for transmitting the motion. The electric motor 53 is a motor means provided with a rotation axis and the reducer 54 is a transmission means for transmitting the motion from the motor means 53 to the container 30. On the electronic card 50 an electric battery 56 is also mounted in order to supply both the electronic card 50 and motoreducer 52.

On the support 10 there is a first housing 13 for the electric battery 56 and a second housing 14 for the coaxial motoreducer 52, when the electronic card 50 is placed against the lower part of the flat base 11 of the support 10, the electric battery 56 is housed in the first housing 13 and the motoreducer 52 is housed in the second housing 14.

On the bottom 31 of the container 30 there is a recess 33 forming a seat designed to house the second housing 14 of the support 10 containing the motoreducer 52.

The recess 33 has in the middle an indentation 34 wherein the exit shaft 55 of the motoreducer 52 is inserted, thus integrating the container 30 with the motor shaft, so as to transmit the rotation motion from the electric motor 53 to the container 30.

Finally, on the base 11 of the support 10 a little cover 60 is applied, so as to enclose the components of the device 8 and, moreover, the control keys for setting up the feeding cycle are placed on the little cover 60.

Figure 4:
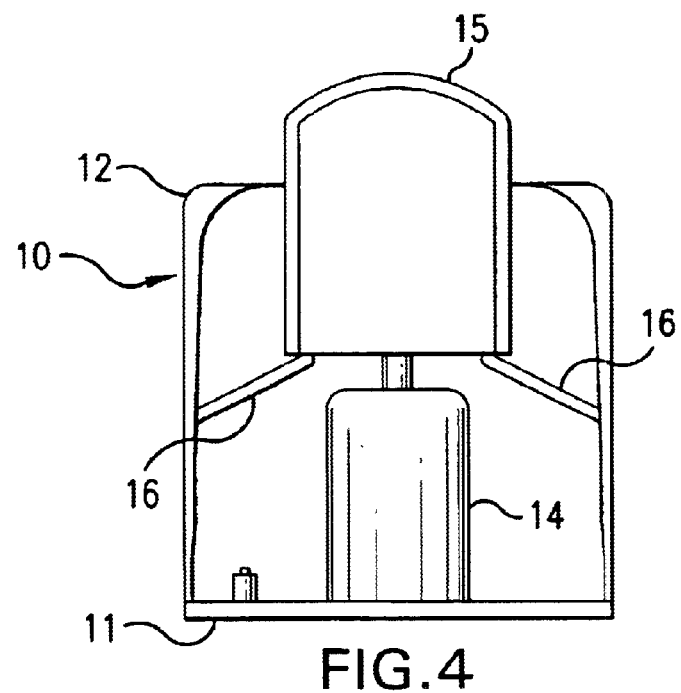
FIG. 4 is a side view of the mechanical means which prevent the entry of moisture into the container.

From FIGS. 1 and 4, it can be noted that from the curved wall 12 of the support 10 comes out a tab 15 sliding along a direction substantially parallel to the rotation axis of the container 30 and biased by elastic winged springs 16.

The tab 15 is adjustable between two positions, a first position or rest position wherein it covers the lower portion of the container 30 at the area where fish food comes out (see FIGS. 1 and 4) and a second position or operative position wherein the tab 15 is in a re-entrant position with respect to the support 10 therefore it does not cover the lower portion of the container 30 at the area where fish food comes out.

From FIG. 2 it can be seen that on the cylindrical wall 32 of the container 30 there is a curved projection 37 which partially surrounds the opening 35 at the side opposite to the open edge 30A.

The curved projection 37 interacts with the free end of the tab 15 so that, by rotating the container 30 when this approaches the position where the opening 35 is oriented downwards, the curved projection 37 presses against the tab 15 which moves from said rest position to said operative position compressing the elastic springs 16 and making fish food fall by gravity.

The automatic distributor 8 also includes mechanical means to prevent moisture, which comes into contact with the external surface of the container 30, from penetrating inside the container through the opening 35. Two embodiments in accordance with the mechanical means are described.

When the container 30 has passed the position where the opening 35 is oriented downwards (and then fish food is discharged), the projection 37 begins to release the free end of the tab 15 and elastic springs 16, thus returning the tab 15 to rest position. In one embodiment, in accordance with the present invention, the mechanical means to prevent moisture from penetrating inside the container 30 includes the tab 15 mounted on the support means 10, and adjustable between two positions. The first position, or rest position, is where the tab covers the lower portion the container 30 at the area where the fish food comes out. The second position, or operative position, is where the tab 15 does not cove the lower portion of the container 30 at the area where the fish food comes out. It is note that the tab 15 shifts to the opened position by the rotation of the container 30, and the tab shifts to the closed position by the elastic springs 16 (i.e. elastic means).

A different way to prevent moisture from coming into the container 30 through the opening 35 is provided by an alternate embodiment of the mechanical means. in accordance with the present invention. The mechanical means, in this embodiment, consists of protrusions projecting from the external surface of the container 30 near the edges of the opening 35. In so doing the moisture which comes into contact with the surface of the container 30 changes direction and does not penetrate inside through the opening 35.

The electronic card 50 permits the programming of the feeding cycle at a predetermined time in particular with a feeding frequency equal to one, two or three times per day operating by a selector key 62 having three operative positions and placed on the little cover 60. In so doing the electronic card is less sophisticated, and the ligthing display indicating the programmig cycle becomes superfluous.

The many advantages deriving from the use of such an automatic distributor are evident and can be summed up as following: reduction of the number of components, ease of construction and assembly, reliability in operation, reduction of the overall dimensions and also of the final cost.

In the end, it is evident that each change or variation conceptually or functionally equivalent fall inside the scope of the present invention. For example the number of recessed steps of the cover may be different, as well as the placement of the curved projection may be constructed directly onto the free end of the tab, instead of container.

What is claimed is:

1. An automatic distributor of fish food for aquariums comprising:
    a container for fish food rotating around a substantially horizontal rotation axis and provided with an opening, near the free end of the container, for exit of fish food by gravity;
    a cover applied on the container;
    motor means provided with a rotation axis and transmission means for transmitting motion from the motor means to the container, wherein a motoreducer comprises the motor means and the transmission means; and
    control means for programming rotation of the container, wherein the container has at a bottom a recess forming a housing for the motor means and the transmission means, wherein the rotation axis of the container is aligned with a motor axis of the motor means.

2. An automatic distributor according to claim 1, wherein said motoreducer is a coaxial motoreducer.

3. An automatic distributor according to claim 2, wherein said container is substantially cylindrical in shape and said recess is also substantially cylindrical and coaxial with respect to said container.

4. An automatic distributor according to claim 1, wherein said cover and said container are provided with regulatory setting means of the passage way for the exit, by gravity, of fish food through the opening of the container.

5. An automatic distributor according to claim 4, wherein said regulatory setting means consist of a feeding channel for fish food positioned near the open edge of said container, open at the side facing the cover and having two ends, a first end in communication with the inside of the container and a second end in communication with said opening of said container, and also consist of portions in relief, made on said cover, which internally engage with the feeding channel through the open side of the feeding channel oriented towards the cover so that, by rotating said cover with respect to the container the area of the passage defined between said feeding channel and said portions in relief varies, thus permitting the supplying of fish food of different shapes.

6. An automatic distributor according to claim 5, wherein said feeding channel circumferentially extends and is in contact with the internal wall of said container and that said cover has a cup and a substantially cylindrical tang designed to internally fit to the cylindrical end of said container, said substantially cylindrical tang has a stair shape formed by said portions in relief.

7. An automatic distributor according to claim 6, wherein said portions in relief project with respect to the free edge of the tang.

8. An automatic distributor according to claim 1, wherein the distributor further comprises mechanical means to prevent moisture, which comes into contact with the external surface of said container, from penetrating inside said container through said opening of said container.

9. An automatic distributor according to claim 8, wherein said mechanical means consist of protrusions projecting from the external surface of said container near said opening of said container, so as to prevent moisture from coming inside through said opening.

10. An automatic distributor according to claim 8, wherein said mechanical means comprise a tab mounted on support means and adjustable between two positions, a first position or rest position wherein the tab covers the lower portion of said container at the area where the fish food comes out and a second position or operative position wherein the tab does not cover the lower portion of said container at the area where the fish food comes out, said tab being shifted to the opened position by the rotation of said container and shifted to the closed position by elastic means.

11. An automatic distributor according to claim 10, wherein on the external surface of said container there is a curved projection near the edges of the opening which interacts with the free ends of said tab so that, by rotating said container when the curved projection approaches the position where the opening is oriented downwards, the curved projection presses again said tab which moves from said rest position to said operative position compressing aid elastic springs and making fish food fall by gravity and, when said container has passed the position where the opening is oriented downwards, the curved projection releases the free end of said tab and said elastic springs return the tab to said rest position.

12. An automatic distributor according to claim 11, wherein said elastic means consist of elastic springs.

13. An automatic distributor of fish food for aquariums comprising:
    a container for fish food rotating around a substantially horizontal rotation axis and provided with an opening, near the free end of the container, for exit of fish food by gravity;
    a cover applied on the container;

motor means provided with a rotation axis and transmission means for transmitting motion from the motor means to the container;

control means for programing rotation of the container, wherein the container has at a bottom a recess forming a housing for the motor means and the transmission means, wherein the rotation axis of the container is aligned with a motor axis of the motor means; and a selector key, having at least two operative positions, which supplies input data to an electronic card at each operative position corresponding to a predetermined number of revolutions the container has to make after a predetermined time period.

14. An automatic distributor according to claim 13, wherein said selector key has three operative positions.

15. An automatic distributor according to 14, wherein at each of said three operative positions the predetermined time period corresponds to 24, 12 and 8 hours.

16. An automatic distributor according to claim 13, wherein said predetermined number of revolutions is one.

17. An automatic distributor according to claim 13, wherein said predetermined number of revolutions is two.

* * * * *